(12) United States Patent
Feldman et al.

(10) Patent No.: US 7,957,643 B2
(45) Date of Patent: Jun. 7, 2011

(54) METHOD AND APPARATUS FOR AUTOMATICALLY CONTROLLING OPTICAL SIGNAL POWER IN OPTICAL TRANSMISSION SYSTEMS

(75) Inventors: Robert D. Feldman, Middleton, NJ (US); Janet M. Greenberg, Freehold, NJ (US); Mile Radovanovic, Morganville, NJ (US); Singanallur R. Thangavelu, Dayton, NJ (US); William A. Thompson, Red Bank, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1857 days.

(21) Appl. No.: 10/092,746

(22) Filed: Mar. 7, 2002

(65) Prior Publication Data

US 2004/0208519 A1 Oct. 21, 2004

(51) Int. Cl.
*H04B 10/08* (2006.01)
(52) U.S. Cl. ............... 398/30; 398/15; 398/17; 398/20; 398/25; 398/32; 398/33; 398/38
(58) Field of Classification Search ............... 398/6, 62, 398/64, 9, 15–38; 250/227.14, 205
See application file for complete search history.

(56) References Cited

U.S. PATENT DOCUMENTS

| | | | |
|---|---|---|---|
| 4,833,668 A * | 5/1989 | Rowley et al. | 398/21 |
| 4,994,675 A * | 2/1991 | Levin et al. | 250/551 |
| 5,099,349 A | 3/1992 | Yoshida et al. | 359/161 |
| 5,136,410 A * | 8/1992 | Heiling et al. | 398/15 |
| 5,500,756 A | 3/1996 | Tsushima et al. | 359/174 |
| 5,535,037 A * | 7/1996 | Yoneyama | 398/181 |
| 5,923,453 A | 7/1999 | Yoneyama | 359/177 |
| 5,986,782 A | 11/1999 | Alexander et al. | 359/110 |
| 6,304,347 B1 | 10/2001 | Beine et al. | 359/110 |
| 6,317,255 B1 | 11/2001 | Fatehi et al. | 359/341.44 |
| 6,359,708 B1 | 3/2002 | Goel et al. | 359/110 |
| 6,359,713 B1 * | 3/2002 | DeCusatis et al. | 398/178 |
| 6,423,963 B1 * | 7/2002 | Wu | 250/227.14 |
| 6,483,616 B1 * | 11/2002 | Maddocks et al. | 398/1 |
| 6,504,630 B1 * | 1/2003 | Czarnocha et al. | 398/15 |
| 6,583,899 B1 * | 6/2003 | Casanova et al. | 398/9 |
| 2003/0020994 A1 * | 1/2003 | Boden | 359/173 |
| 2003/0081295 A1 * | 5/2003 | Kamura | 359/174 |
| 2004/0052524 A1 * | 3/2004 | Arnold | 398/38 |

FOREIGN PATENT DOCUMENTS

EP 0 853 394 A2 7/1998

OTHER PUBLICATIONS

U.S. Appl. No. 09/205,412, filed Dec. 4, 1998, Czarnocha et al. inventors, entitled Automatic Power Shut-Down Arrangement for Optical Line Systems.

* cited by examiner

*Primary Examiner* — Li Liu
(74) *Attorney, Agent, or Firm* — Wall & Tong, LLP

(57) ABSTRACT

A method and apparatus for controlling the power level of an optical signal includes detecting the loss of a supervisory signal counter-propagating in an optical fiber.

16 Claims, 4 Drawing Sheets

METHOD AND APPARATUS FOR AUTOMATICALLY CONTROLLING OPTICAL SIGNAL POWER IN OPTICAL TRANSMISSION SYSTEMS

BACKGROUND OF THE INVENTION

1. Field of the Invention

The present invention generally relates to lightwave communications systems and, more particularly, to a method and apparatus for controlling the power level of an optical signal.

2. Description of the Related Art

Retinal and other types of eye injury can occur from inadvertent direct exposure to the optical signals used in present lightwave communication systems. The power and wavelength of optical signals used in such systems presents an exposure danger. Generally, these systems operate with signals having relatively high power concentrated in a tiny beam located outside the visible spectrum region of light.

Recent developments in optical networking have only heightened existing safety concerns. For example, optical amplifiers and other optical components are now being developed to drive optical signals to even higher output power levels. Mutli-wavelength systems, such as dense wavelength division multiplexed (DWDM) systems, are also a concern because the total optical power in the optical fiber is the sum of the powers of the individual wavelength components. Consequently, optical systems having total output power of 27 dBm or more are now being realized as a result of advances in optical amplifier and multi-wavelength optical networking technologies.

Because the extent of injury is most likely proportional to the total output power and the time of exposure, it is necessary to quickly shut off or reduce the output power of a network element in the event of a fiber cut, removed connector, or any other discontinuity in the optical fiber path. In prior arrangements, control of upstream network elements relies entirely upon downstream network elements. For example, downstream network elements perform fault detection and localization by monitoring the degradation or interruption of the forward propagating optical signal (i.e., the signal propagating downstream). If such a degradation or interruption is detected, the downstream network element must notify the upstream network element of the fault. This scheme is limited in that handshaking between two network elements is necessary, which slows the response of the system. Present safety standards require faster shutdown times as the optical power levels are increased. In addition, if the downstream network element cannot communicate with the upstream network element (e.g., there is a discontinuity in the optical path), then this scheme will fail to switch off the upstream network element.

SUMMARY OF THE INVENTION

The present invention is a method and apparatus for controlling the power level of an optical signal such that the risk of harm due to the optical signal emanating from a fault in an optical fiber path is substantially reduced. Upon detecting the loss of a supervisory signal counter-propagating in the optical fiber at a network element upstream from a fault in the optical fiber, the optical signal power supplied by at least one gain element in the upstream network element is automatically reduced. In addition, upon detecting the loss of the optical data signal propagating in the optical fiber at a network element downstream from the fault, the optical signal power supplied by at least one gain element in the downstream network element is also automatically reduced. By employing the counter-propagating supervisory signal, the present invention does not require any additional signaling from downstream network elements, which avoids delay.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Although the principles of the present invention are particularly applicable to controlling the optical signal power supplied by fiber optical amplifiers, and shall be described in this context, those skilled in the art will understand from the teachings herein that the principles of the present invention are also applicable to many other optical components including, but not limited to, semiconductor optical amplifiers, optical transmitters (e.g., laser sources), add/drop multiplexers, optical cross-connects, dispersion compensation modules (DCM), or any element that supplies or propagates optical signals along an optical fiber.

Figure 1:
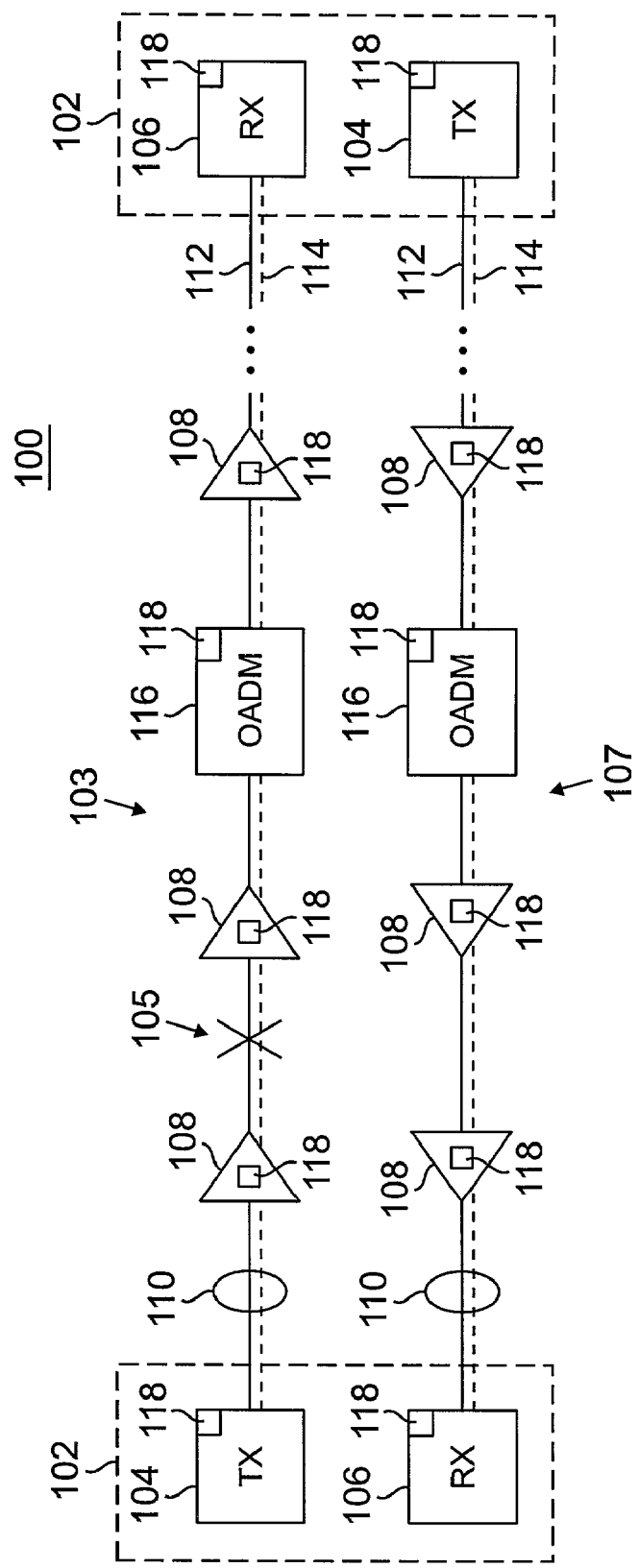
FIG. 1 shows a simplified block diagram of an exemplary lightwave communication system embodying the principles the present invention.

FIG. 1 shows a typical lightwave communication system 100 incorporating the present invention. The system 100 comprises a pair of end terminals 102 (also referred to as network elements) interconnected by a pair of optical transmission lines 103 and 107. Each end terminal 102 comprises an optical transmitter 104 and an optical receiver 106. The optical transmitter 104 converts electrical data signals to optical data signals 112 for transmission over an optical fiber 110 of each optical transmission line 103 and 107 to a corresponding optical receiver 106. The optical receiver 106 reconverts the optical data signals 112 to electrical signals. The optical data signal 112 typically comprises a plurality of wavelengths of light, each wavelength providing a different optical communication channel. For example, the lightwave communication system 100 supports many optical channels, illustratively 128 channels, each using a different optical carrier wavelength. Optical channels can be modulated at, for example, 10 Gbps. The carrier wavelengths are illustratively in the vicinity of 1555 to 1608 nm. These are merely illustrative system characteristics. If desired, more or less channels can be provided, signals may be modulated at a different rate, and a different range of carrier wavelengths can be supported.

Figure 2:
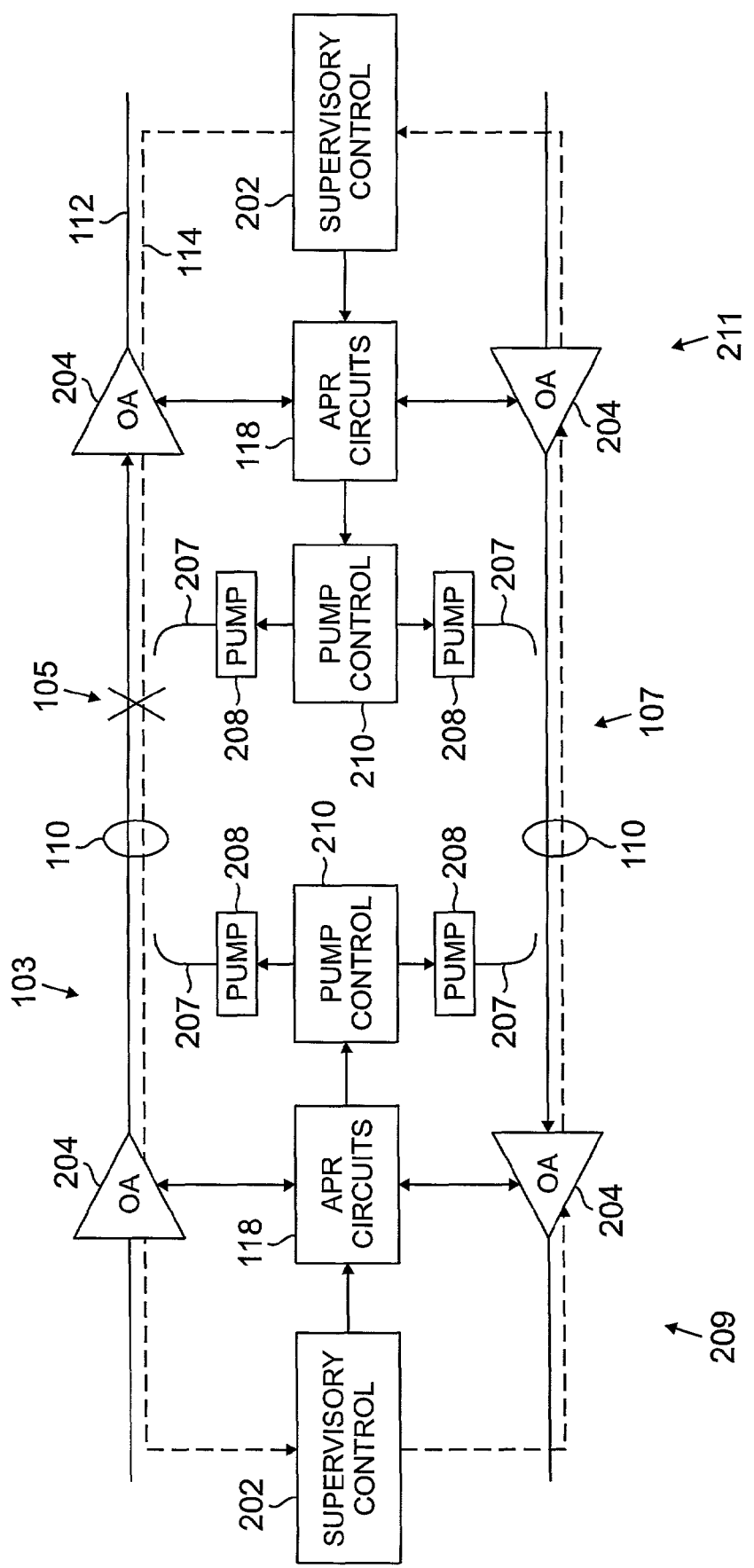
FIG. 2 shows a block diagram of an illustrative network element arrangement with automatic power reduction capabilities in accordance with the present invention.

In the present example, each optical transmission line 103 and 107 includes various network elements, such as multiple stages of repeaters 108 and an optical add/drop multiplexer (OADM) 116. In general, optical transmission lines 103 and 107 could be any type of simple or complex arrangement of components. The repeaters 108 and OADM 116 are separated by spans of optical fiber 110. Fiber spans may be on the order of 40-120 km in length for long-haul networks, or may be any other suitable length for use in signal transmission in a lightwave communication system. Repeaters 108 include gain elements (an example is shown in FIG. 2) for amplifying the optical data signal 112 as it travels along optical fiber 110. The OADM 116 can be used to separate channels at certain wavelengths from the optical data signal 112. The separated channels may be provided to another network (not shown). In addition, the OADM 116 can be used to add channels at certain wavelengths to the optical data signal 112. The operation of add/drop multiplexers, such as OADM 116, is well known in the art.

In addition, some (preferably all) of the transmitters 102, receivers 106, repeaters 108, and OADMs 116 include automatic power reduction (APR) circuitry 118 for automatically reducing their output power in the direction of a fault. Specifically, the present invention will now be described with respect to a fault 105 in optical transmission line 103 (e.g., a cut in optical fiber 110) occurring between two repeaters 108. The position of the fault 105 is illustrative, as the fault 105 can occur between any two network elements on a given transmission line 103 or 107, such as between the transmitter 104 and repeater 108, between a repeater 108 and OADM 116, and between a repeater 108 and the receiver 106. As described above, the power levels emanating from a cut in an optical fiber may reach 27 dBm or more. When fault 105 occurs between two repeaters 108, the repeater 108 upstream from the fault 105, as well as the repeater 108 downstream from the fault 105, must reduce power output levels by a predetermined amount (i.e., an amount such that harm from an optical signal emanating from the fault 105 is substantially reduced).

In accordance with the present invention, a supervisory signal 114 is transmitted between end terminals 102 through optical fiber 110 such that the supervisory signal 114 counter-propagates with the optical data signal 112. That is, the supervisory signal 114 propagates along optical transmission lines 103 and 107 against the optical data signal 112. In absence of fault 105, a given network element receives the supervisory signal 114 and propagates it along to the next upstream network element along the transmission lines 103 and 107. When a fault 105 occurs, repeater 108 downstream from the fault 105 detects loss of the optical data signal 112 and reduces its output power propagating towards the fault 105 via its APR circuitry 118. Likewise, repeater 108 upstream from the fault detects loss of the supervisory signal 114 and reduces its output power propagating towards the fault 105 via its APR circuitry 118. The detection of loss of both the optical data signal 112 and the supervisory signal 114 can occur substantially at the same time.

The present invention obviates the need for the downstream repeater 108 to notify the upstream repeater 108 of the fault 105. The power of an emanating optical signal is reduced within 250 to 300 milliseconds. The present invention thus advantageously reduces the output power of an optical signal emanating from a fault in the optical fiber path much quicker than conventional systems, which can take as long as 2 to 3 seconds to reduce power levels. Furthermore, the present invention employs a counter-propagating supervisory signal, which obviates the need for an additional transmitter and detector in each network element for transmitting an extra signal used solely for the purpose of APR. Such additional transmitter and detector circuitry would increase system cost, and would introduce additional losses in the signal path for combining and removing the extra signal. Use of the counter-propagating supervisory signal also avoids having to detect loss of the counter-propagating pump power to begin APR, which would also require an additional detector in each network element.

FIG. 2 is a more detailed block diagram showing portions of two repeaters 108 upstream and downstream from the fault 105. For simplicity, only half of each repeater 108 is shown (i.e., the halves "facing" the fault 105 in transmission line 103). Portion 209 is referred to herein as the upstream network element, and portion 211 is referred to herein as the downstream network element. FIG. 2 is merely exemplary of the optical components comprising a network element, such as repeater 108. As shown, each network element 209 and 211 comprises optical amplifiers 204, pump sources 208, a pump control circuit 210, a supervisory channel control circuit 202, and APR circuits 118. The optical amplifiers 204 comprise erbium doped fiber amplifiers (EDFAs), or like type rare-earth doped optical amplifiers known in the art. In order to provide an amplifying effect, the optical amplifiers 108 are "pumped" with luminous energy using techniques known in the art. By controlling the pump sources inside the optical amplifiers 108 (internal pump sources not shown), the gain of optical amplifiers 108 supplied to the optical data signal 112 is controlled.

In addition, each fiber 110 is optically pumped by pump sources 208, which can be semiconductor laser pump assemblies, such as laser pump diodes or any other suitable pump sources well known in the art. When used in this description, pump sources 208 can represent any or all pump sources used for fiber optical amplification purposes, such as, but not limited to, Raman pumps used to provide gain in the optical fiber 110 via Stimulated Raman Scattering. The luminous energy generated by pump sources 208, also referred to as pump light, has a shorter wavelength than any of the wavelengths in the optical data signal 112. Optical couplers 207 are used to couple the pump light emitted by pump sources 208 to the optical fiber 110. The use of optical couplers 207 for this purpose is also well known to those skilled in the art.

As shown in FIG. 2, the pump source 208 coupled to the optical transmission line 103 in the upstream network element 209 supplies a pump signal that co-propagates with the optical data signal 112. Whereas the pump source 208 coupled to the optical transmission line 103 in the downstream network element 211 supplies a pump signal that counter-propagates with the optical data signal 112 (i.e., travels in the opposite direction of the optical data signal 112). Together, these two pump sources provide amplification of the optical data signal 112 in the span of optical fiber 110 between the upstream and downstream network elements 209 and 211, respectively. The pump sources 208 are under control of their respective pump control circuits 210. The pump control circuits 210 control the output power of the co-propagating and counter-propagating pump signals supplied by the pump sources 208.

Figure 3:
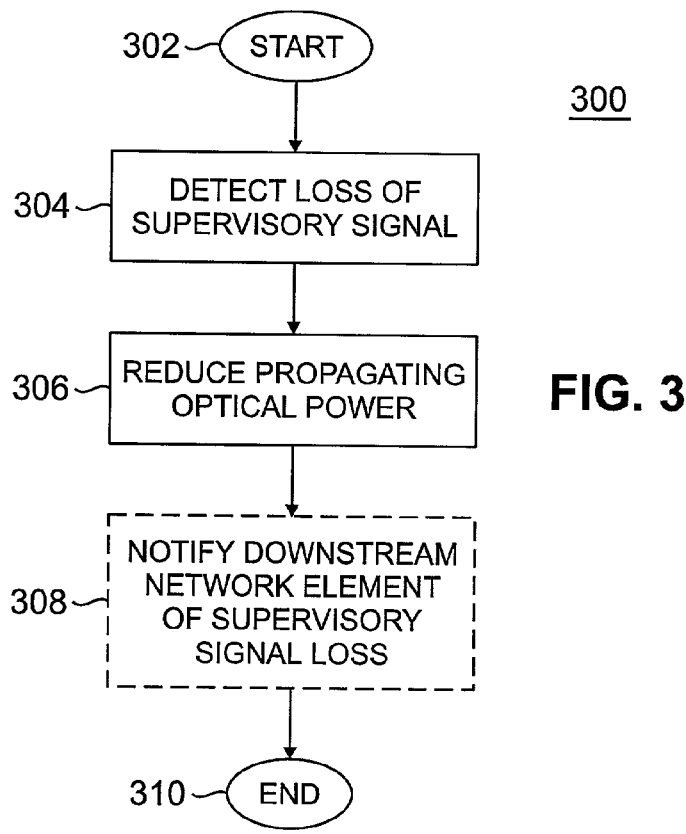
FIG. 3 is a flow diagram illustrating an automatic power reduction method for a network element upstream from a fault in an optical fiber.
Figure 4:
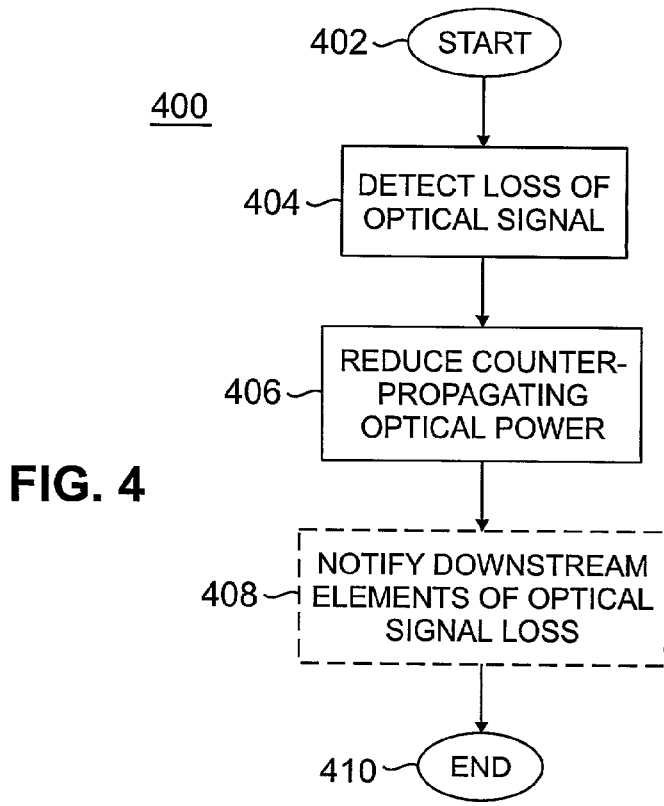
FIG. 4 is a flow diagram depicting an automatic power reduction method for a network element downstream from a fault in an optical fiber.

As described above with respect to FIG. 1, the present invention employs a counter-propagating supervisory signal 114. The supervisory signal 114 is controlled via supervisory control circuits 202. Both the supervisory control circuits 202 and the optical amplifiers 204 are coupled to APR circuitry 118. APR circuitry 118 is further coupled to the pump control circuits 210. Operation of the present invention can best be understood with simultaneous reference to FIGS. 2, 3, and 4. FIG. 3 is a flow diagram illustrating a portion of one embodiment of an automatic power reduction method 300 for upstream network element 209. FIG. 4 is a flow diagram depicting a portion of one embodiment of an automatic power reduction method 300 for downstream network element 211. Together, FIGS. 3 and 4 illustrate one embodiment of an automatic power reduction and recovery method 300.

As described above, fault 105 occurs between the upstream network element 209 and the downstream network element 211. Referring to FIG. 3, at step 302 the upstream portion of the APR method 300 begins. At step 304, the upstream network element 209 detects the loss of the supervisory signal 114. The loss of the supervisory signal 114 is determined by supervisory control circuitry 202, which notifies APR circuits 118 of the supervisory signal less. At step 306, the upstream network element 209 reduces its optical output power propagating towards the fault 105. In the present embodiment, the optical output power of the upstream network element 209 comprises the optical data signal 112 and the co-propagating pump signals supplied by pump source 208. In this embodiment, the APR circuits 118 cause the pump control circuit 210 in the upstream network element 209 to reduce pump power in pump source 208. In addition, the APR circuits 118 cause the optical amplifier 204 to reduce gain supplied to the optical data signal 112, reducing the power of the optical data signal. Those skilled in the art will appreciate that APR circuits 118 can control the power supplied by any of the various optical components that can be in the upstream network element 209.

At optional step 308, the upstream network element 209 can notify the downstream network element 211 of the loss of the supervisory signal 114 counter-propagating in optical transmission line 103. This notification can be used for power recovery purposes (described below with respect to FIG. 5), and is independent of the automatic power reduction method 300. At step 310, the upstream network element 209 has finished power reduction.

Referring now to FIG. 4, at step 402 the downstream portion of the APR method 300 begins. At step 404, the downstream network element 211 detects the loss of the optical data signal 112. The loss of the optical data signal can be determined by power measurement or optical monitoring circuits (not shown) within the downstream network element 211. At step 406, the downstream network element reduces its optical output power propagating towards the fault 105. In the present embodiment, the optical output power of the downstream network element 211 propagating towards the fault 105 comprises the counter-propagating pump signals supplied by pump source 208 and the counter-propagating supervisory signal 114. In this embodiment, the APR circuits 118 cause the pump control circuit 210 in the downstream network element 211 to reduce pump power in pump source 208. Again, those skilled in the art will appreciate that APR circuits 118 can control the power supplied by any of the various optical components that can be in the downstream network element 211.

At optional step 408, the downstream network element 211 can notify additional downstream network elements (shown in FIG. 1) of the loss of the optical data signal. Again, this notification can be used for power recovery purposes (described below with respect to FIG. 5), and is independent of the automatic power reduction method 300. At step 410, the downstream network element 211 has finished power reduction.

Power reduction for the upstream network element 209 and the downstream network element 211 can occur substantially at the same time. After the propagating and counter-propagating optical signal power has been reduced, the power of the optical signal emanating from the fault 105 is reduced by a predetermined amount to substantially reduce harm that could be cause by such an emanation. In addition to the upstream and downstream network elements 209 and 211, one or more additional downstream network elements (shown in FIG. 1) will also reduce their output power propagating towards the fault 105 due to the loss of optical data signal 112. That is, since no optical data signal 112 is transmitted past the fault 105, each network element downstream from the fault 105 (in addition to the downstream network element 211) will detect loss of the optical data signal 112. As such, these one or more addition downstream network elements will also execute the portion of method 300 shown in FIG. 4.

Although the APR method 300 of the present invention has been described with respect to an optical fiber cut, those skilled in the art will appreciate that the present invention is useful for other types of faults, such as the failure, removal, or power cycling of optical components in a network element, or any other discontinuity in the fiber optic path. Moreover, although the present invention has been described above with respect to a two-fiber lightwave transmission system, the APR method of the present invention can be used in any lightwave transmission system having one or more transmission fibers.

Figure 5:
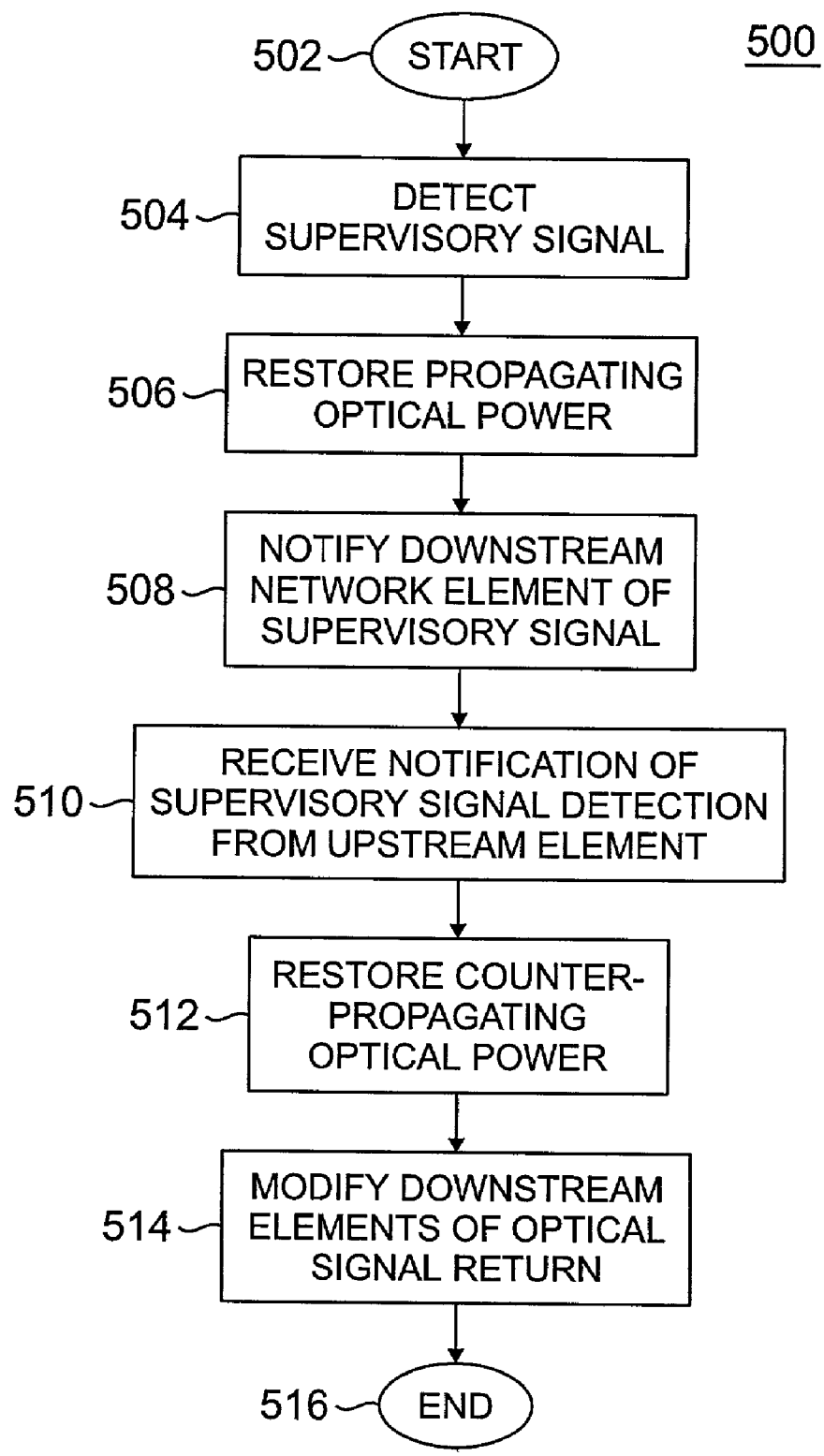
FIG. 5 is a flow diagram depicting a power recovery method for use with the present invention.

FIG. 5 is a flow diagram illustrating an automatic power recovery method 500 that can be used with the present invention. The power recovery method 500 is executed after the fault 105 in the optical transmission line 103 has been repaired. At step 502, the power recovery method 500 begins. At step 502, the upstream network element 209 detects the presence of the supervisory signal 114 by sensing the power of that signal. At step 506, the optical signal power output from the upstream network element 209 is restored. In the embodiment described above with respect to FIG. 2, the upstream network element 209 activates the co-propagating pump signals supplied by pump 208. In addition, the gain supplied to the optical data signal 112 by optical amplifier 204 is restored. Of course, if the upstream network element 209 contains any additional optical components, the output power of those components is also restored.

As described above with respect to FIG. 4, the APR method 300 can contain optional step 308, where the upstream network element 209 notifies the downstream network element 211 of the loss of the supervisory signal 114. In one embodiment, this notification comprises setting an indicator in the SONET overhead of the supervisory signal 114 transmitted from the upstream network element 209 to the downstream network element 211 via optical transmission line 107. Thus, at step 508, the upstream network element 209 notifies the downstream network element 211 of the detection of the supervisory signal 114 on the repaired optical transmission line 103. This is accomplished by unsetting the supervisory signal loss indicator in the SONET overhead of the supervisory signal 114 transmitted on the optical transmission line 107.

At step 510, the downstream network element 211 receives notification that the upstream network element 209 detected the supervisory signal 214. At step 512, the downstream network element 211 restores its optical power propagating towards the upstream network element 209. In the embodiment described above with respect to FIG. 2, the downstream network element 211 activates the counter-propagating pump signals supplied by pump 208. At step 514, the downstream network element 211 notifies the one or more additional downstream network elements of the detection of the optical data signal 112. These one or more additional downstream network elements can restore their counter-propagating optical power accordingly. At step 516, the power recovery method 500 ends.

As previously described, the principles of the present invention may also be advantageously used to control optical signal power supplied by other optical components even though the above embodiments were described only in the context of fiber optical amplifiers. For example, the present invention can be used to control output power levels of semiconductor optical amplifiers, dispersion compensation modules, and other like type optical components. Thus, while foregoing is directed to the preferred embodiment of the present invention, other and further embodiments of the invention may be devised without departing from the basic scope thereof, and the scope thereof is determined by the claims that follow.

The invention claimed is:

1. A method, comprising:
   reducing the power level of an optical data signal propagating in a downstream optical fiber path in response to a loss of a counter-propagating supervisory signal in the optical fiber path;
   reducing counter-propagating optical power in an upstream optical fiber path in response to a loss of the optical data signal; and
   responsive to the loss of the optical data signal, reducing counter-propagating optical signal power output in the upstream optical fiber path from at least one additional network element by a predetermined amount.

2. The method of claim 1, wherein the step of reducing the power level of the optical data signal and the step of reducing counter-propagating optical power are performed substantially at the same time.

3. The method of claim 1, wherein the step of reducing the power level of the optical data signal comprises at least one of:
   reducing pump power supplied by at least one pump source coupled to the downstream optical fiber path; and
   reducing gain supplied by at least one optical amplifier coupled to the downstream optical fiber path.

4. The method of claim 3, wherein the step of reducing the counter-propagating optical power comprises reducing counter-propagating pump power supplied by at least one pump source coupled to the upstream optical fiber path.

5. The method of claim 1, wherein the power level of the optical data signal is reduced by a predetermined amount such that harm from an optical signal emanating from a fault in the downstream optical fiber path is substantially reduced.

6. The method of claim 1, wherein the counter-propagating optical power is reduced by a predetermined amount such that harm from an optical signal emanating from a fault in the upstream optical fiber path is substantially reduced.

7. The method of claim 1, further comprising the step of restoring the power level of the optical data signal in response to the presence of the counter-propagating supervisory signal.

8. The method of claim 1, further comprising the step of restoring the counter-propagating optical power in response to a notification of the presence of the counter-propagating supervisory signal.

9. A method, comprising:
   a) detecting loss of a supervisory signal counter-propagating in a downstream optical fiber path at a first network element;
   b) responsive to the loss of the supervisory signal in the downstream optical fiber path, reducing the power level of an optical data signal output to the optical fiber path from the first network element by a predetermined amount;
   c) detecting loss of the optical data signal propagating in the downstream optical fiber path at a second network element;
   d) responsive to the loss of the optical data signal, reducing counter-propagating optical power output in the upstream optical fiber path from the second network element by a predetermined amount; and
   e) responsive to the loss of the optical data signal, reducing counter-propagating optical signal power output in the upstream optical fiber path from a third network element by a predetermined amount.

10. The method of claim 9, wherein the steps b) and d) are performed substantially at the same time.

11. The method of claim 9, wherein step b) comprises at least one of:
    reducing pump power supplied by at least one pump source coupled to the downstream optical fiber path in the first network element; and
    reducing gain of at least one optical amplifier coupled to the downstream optical fiber path in the first network element.

12. The method of claim 9, wherein step d) comprises reducing counter-propagating pump power supplied by at least one pump source coupled to the upstream optical fiber path in the second network element.

13. A network element adapted for use in an optical transmission system, comprising:
    a first gain element, for providing a downstream optical signal to a downstream optical fiber path;
    a first controller, for reducing the power level of the downstream optical signal generated by the first gain element to the downstream optical fiber path in response to the absence of a counter-propagating supervisory signal in the downstream optical fiber path;
    a second gain element, for providing a counter-propagating upstream optical signal to an upstream optical fiber path; and
    a second controller, for reducing the power level of the counter-propagating upstream optical signal generated by the second gain element to the upstream optical fiber path in response to the loss of an optical signal propagating in the downstream optical fiber path,
    wherein the first controller, in response to the absence of the counter-propagating supervisory signal, provides an indication to a downstream network element that the supervisory signal is absent.

14. The network element of claim 13, wherein the network element comprises a repeater.

15. The network element of claim 14, wherein the at least one gain element comprises at least one of an optical amplifier and a pump source.

16. In a lightwave communication system having a plurality of network elements for supplying an optical signal adapted for transmission in an optical fiber path, an apparatus for controlling power of an optical signal propagating in the optical fiber path comprising:
    means for detecting loss of a supervisory signal counter-propagating in a downstream optical fiber path;
    a first automatic power reduction circuit for reducing the power level of an optical data signal output to the downstream optical fiber path from a first network element by a predetermined amount in response to the loss of the supervisory signal in the downstream optical fiber path;

means for detecting loss of the optical data signal propagating in the downstream optical fiber path;

a second automatic power reduction circuit for reducing counter-propagating optical power output in an upstream optical fiber path from a second network element by a predetermined amount in response to the loss of the optical data signal; and a controller, in response to the absence of the counter-propagating supervisory signal, provides an indication to a third network element that the supervisory signal is absent.

* * * * *